US008155313B2

(12) United States Patent
Grant

(10) Patent No.: US 8,155,313 B2
(45) Date of Patent: Apr. 10, 2012

(54) SYSTEMS AND METHODS FOR EMPLOYING DUO CODES FOR PRODUCT AUTHENTICATION

(75) Inventor: Elliott Grant, Redwood City, CA (US)

(73) Assignee: YottaMark, Inc., Redwood City, CA (US)

( * ) Notice: Subject to any disclaimer, the term of this patent is extended or adjusted under 35 U.S.C. 154(b) by 918 days.

(21) Appl. No.: 12/143,085

(22) Filed: Jun. 20, 2008

(65) Prior Publication Data

US 2008/0256367 A1     Oct. 16, 2008

Related U.S. Application Data

(63) Continuation-in-part of application No. 11/743,648, filed on May 2, 2007, now abandoned, which is a continuation-in-part of application No. 11/347,424, filed on Feb. 2, 2006, now Pat. No. 7,614,546.

(60) Provisional application No. 60/650,364, filed on Feb. 3, 2005.

(51) Int. Cl.
*G09C 5/00* (2006.01)
(52) U.S. Cl. .......................................................... 380/55
(58) Field of Classification Search .................... 380/55; 705/50, 62; 283/72, 73, 81, 98
See application file for complete search history.

(56) References Cited

U.S. PATENT DOCUMENTS

| | | | |
|---|---|---|---|
| 3,329,181 A | 7/1967 | Buss | |
| 4,385,482 A | 5/1983 | Booth | |
| 4,526,404 A | 7/1985 | Vazquez | |
| 4,544,590 A | 10/1985 | Egan | |
| 4,832,204 A | 5/1989 | Handy et al. | |
| 4,846,504 A | 7/1989 | MacGregor et al. | |
| 5,136,826 A | 8/1992 | Carson et al. | |
| 5,271,642 A | 12/1993 | Jahier et al. | |
| 5,343,529 A | 8/1994 | Goldfine et al. | |
| 5,360,628 A | 11/1994 | Butland | |
| 5,361,904 A | 11/1994 | Kapec et al. | |

(Continued)

FOREIGN PATENT DOCUMENTS

CN    1350265 A    5/2002

(Continued)

OTHER PUBLICATIONS

U.S. Appl. No. 11/347,424, Elliott Grant, Method and System for Deterring Product Counterfeiting, Diversion and Piracy, filed Feb. 2, 2006.

(Continued)

*Primary Examiner* — Edward Zee
(74) *Attorney, Agent, or Firm* — Peters Verny, LLP

(57) ABSTRACT

Systems and methods are provided that employ two or more cryptographically linked codes. The codes, when encrypted, become cipher texts that appear unrelated. The codes described herein are characterized by a series of bits including one or more switch bits. The cipher text of a code having a switch bit in one state will appear to be unrelated to the cipher text of another code differing only in that the switch bit is in the opposite state. The cryptographically linked codes can be used in various combinations, such as on a product and its packaging, on a product and a component of the product, on a certificate packaged with the product and on the packaging, or on outer and inner packagings of the product.

21 Claims, 6 Drawing Sheets

U.S. PATENT DOCUMENTS

| | | | |
|---|---|---|---|
| 5,478,990 | A | 12/1995 | Montanari et al. |
| 5,486,686 | A | 1/1996 | Zdybel, Jr. et al. |
| 5,561,970 | A | 10/1996 | Edie et al. |
| 5,569,317 | A | 10/1996 | Sarada et al. |
| 5,592,561 | A | 1/1997 | Moore |
| 5,611,948 | A | 3/1997 | Hawkins |
| 5,619,416 | A | 4/1997 | Kosarew |
| 5,768,384 | A | 6/1998 | Berson |
| 5,793,030 | A | 8/1998 | Kelly, Jr. |
| 5,895,073 | A | 4/1999 | Moore |
| 5,917,925 | A | 6/1999 | Moore |
| 6,005,960 | A | 12/1999 | Moore |
| 6,041,929 | A | 3/2000 | Brunner et al. |
| 6,069,955 | A * | 5/2000 | Coppersmith et al. ........ 380/54 |
| 6,203,069 | B1 | 3/2001 | Outwater et al. |
| 6,211,789 | B1 | 4/2001 | Oldham et al. |
| 6,212,638 | B1 | 4/2001 | Lee et al. |
| 6,226,619 | B1 * | 5/2001 | Halperin et al. ........... 705/23 |
| 6,231,435 | B1 | 5/2001 | Pilger |
| 6,246,778 | B1 | 6/2001 | Moore |
| 6,297,508 | B1 | 10/2001 | Barmore et al. |
| 6,308,165 | B1 | 10/2001 | Gilham |
| 6,314,337 | B1 | 11/2001 | Marcum |
| 6,329,920 | B1 | 12/2001 | Morrison et al. |
| 6,342,839 | B1 | 1/2002 | Curkendall et al. |
| 6,346,885 | B1 | 2/2002 | Curkendall |
| 6,349,292 | B1 | 2/2002 | Southerland et al. |
| 6,361,079 | B1 | 3/2002 | Kirkman |
| 6,363,483 | B1 | 3/2002 | Keshav |
| 6,364,990 | B1 | 4/2002 | Grosskopf et al. |
| 6,398,106 | B1 | 6/2002 | Ulvr et al. |
| 6,409,082 | B1 | 6/2002 | Davis et al. |
| 6,428,640 | B1 | 8/2002 | Stevens et al. |
| 6,442,276 | B1 | 8/2002 | Doljack |
| 6,456,729 | B1 | 9/2002 | Moore |
| 6,536,672 | B1 | 3/2003 | Outwater |
| 6,547,137 | B1 | 4/2003 | Begelfer et al. |
| 6,591,252 | B1 | 7/2003 | Young |
| 6,612,494 | B1 | 9/2003 | Outwater |
| 6,664,897 | B2 | 12/2003 | Pape et al. |
| 6,680,783 | B1 | 1/2004 | Pierce et al. |
| 6,766,324 | B2 | 7/2004 | Carlson et al. |
| 6,788,800 | B1 | 9/2004 | Carr et al. |
| 6,796,504 | B2 | 9/2004 | Robinson |
| 6,805,926 | B2 | 10/2004 | Cote et al. |
| 6,806,478 | B1 | 10/2004 | Hatfield |
| 6,808,574 | B1 | 10/2004 | Stevens et al. |
| 6,859,672 | B2 | 2/2005 | Roberts et al. |
| 6,974,298 | B2 | 12/2005 | Tanaka |
| 6,991,261 | B2 | 1/2006 | Dronzek, Jr. et al. |
| 6,995,675 | B2 | 2/2006 | Curkendall et al. |
| 7,013,286 | B1 | 3/2006 | Aggarwal et al. |
| 7,040,532 | B1 | 5/2006 | Taylor et al. |
| 7,137,000 | B2 | 11/2006 | Hohberger et al. |
| 7,207,481 | B2 | 4/2007 | Barenberg et al. |
| 7,211,163 | B2 | 5/2007 | Kennedy |
| 7,222,791 | B2 | 5/2007 | Heilper et al. |
| 7,261,235 | B2 | 8/2007 | Barenburg et al. |
| 7,277,601 | B2 | 10/2007 | Zorab et al. |
| 7,283,630 | B1 | 10/2007 | Doljack |
| 7,295,114 | B1 | 11/2007 | Drzaic et al. |
| 7,321,310 | B2 | 1/2008 | Curkendall et al. |
| 7,412,461 | B2 | 8/2008 | Sholl et al. |
| 7,519,825 | B2 | 4/2009 | Geoffrey |
| 7,686,513 | B2 | 3/2010 | Knoerzer et al. |
| 7,705,735 | B2 | 4/2010 | Pape et al. |
| 7,714,729 | B2 | 5/2010 | Pape et al. |
| 7,766,240 | B1 | 8/2010 | Grant |
| 7,827,058 | B2 | 11/2010 | Mortimer |
| 7,909,239 | B2 | 3/2011 | Grant et al. |
| 2001/0056359 | A1 | 12/2001 | Abreu |
| 2002/0158765 | A1 | 10/2002 | Pape et al. |
| 2002/0178363 | A1 | 11/2002 | Ambrogio et al. |
| 2003/0019186 | A1 | 1/2003 | Hakansson |
| 2003/0080191 | A1 | 5/2003 | Lubow et al. |
| 2003/0098078 | A1 | 5/2003 | Lehner et al. |
| 2003/0170357 | A1 | 9/2003 | Garwood |
| 2003/0177025 | A1 | 9/2003 | Curkendall et al. |
| 2003/0177095 | A1 | 9/2003 | Zorab et al. |
| 2003/0221108 | A1 | 11/2003 | Rupp |
| 2004/0065053 | A1 | 4/2004 | Rice et al. |
| 2004/0200892 | A1 | 10/2004 | Curkendall et al. |
| 2004/0205343 | A1 | 10/2004 | Forth et al. |
| 2004/0230796 | A1 | 11/2004 | Lundvall et al. |
| 2005/0004682 | A1 | 1/2005 | Gaddis et al. |
| 2005/0038756 | A1 | 2/2005 | Nagel |
| 2005/0075900 | A1 | 4/2005 | Arguimbau |
| 2005/0097054 | A1 | 5/2005 | Dillon |
| 2005/0108044 | A1 | 5/2005 | Koster |
| 2005/0182695 | A1 | 8/2005 | Lubow et al. |
| 2005/0247778 | A1 | 11/2005 | Roberts |
| 2005/0251449 | A1 | 11/2005 | Pape et al. |
| 2005/0288947 | A1 | 12/2005 | Mallonee et al. |
| 2006/0004907 | A1 | 1/2006 | Pape et al. |
| 2006/0054682 | A1 | 3/2006 | de la Huerga |
| 2006/0100964 | A1 | 5/2006 | Wilde et al. |
| 2006/0111845 | A1 | 5/2006 | Forbis et al. |
| 2006/0161443 | A1 | 7/2006 | Rollins |
| 2006/0180661 | A1 | 8/2006 | Grant et al. |
| 2006/0187048 | A1 | 8/2006 | Curkendall et al. |
| 2006/0260495 | A1 | 11/2006 | Siedlaczek |
| 2007/0001006 | A1 | 1/2007 | Schuessler et al. |
| 2007/0051362 | A1 | 3/2007 | Sullivan et al. |
| 2007/0119954 | A1 | 5/2007 | Barenburg et al. |
| 2007/0119955 | A1 | 5/2007 | Barenburg et al. |
| 2007/0205258 | A1 | 6/2007 | Self et al. |
| 2007/0170240 | A1 | 7/2007 | Grant et al. |
| 2007/0175974 | A1 | 8/2007 | Self et al. |
| 2007/0203724 | A1 | 8/2007 | Farmer et al. |
| 2007/0203818 | A1 | 8/2007 | Farmer et al. |
| 2007/0219916 | A1 | 9/2007 | Lucas |
| 2008/0011841 | A1 | 1/2008 | Self et al. |
| 2008/0011843 | A1 | 1/2008 | Barenburg et al. |
| 2008/0023472 | A1 | 1/2008 | Brandt |
| 2008/0030348 | A1 | 2/2008 | Pape et al. |
| 2008/0046263 | A1 | 2/2008 | Sager et al. |
| 2008/0143094 | A1 | 6/2008 | Goetz |
| 2008/0178197 | A1 | 7/2008 | Pape et al. |
| 2008/0215484 | A1 | 9/2008 | Oldham et al. |
| 2009/0242631 | A1 | 10/2009 | Wishnatzki et al. |
| 2010/0106660 | A1 | 4/2010 | Farmer et al. |
| 2011/0098026 | A1 | 4/2011 | Uland |

FOREIGN PATENT DOCUMENTS

| | | |
|---|---|---|
| JP | 2000011114 A | 6/1998 |
| JP | 2002140449 A | 5/2002 |
| WO | 03007252 A1 | 1/2003 |
| WO | 2006084090 A2 | 8/2006 |
| WO | 2007140018 A2 | 12/2007 |

OTHER PUBLICATIONS

U.S. Appl. No. 11/619,747, Matthew Self, System and Method of Code Generation and Authentication, filed Jan. 4, 2007.

U.S. Appl. No. 11/743,648, Matthew Self, System and Method of Product Information Coding and Authentication, filed May 2, 2007.

U.S. Appl. No. 11/743,652, Matthew Self, System and Method of Product Identification Using a URL, filed May 2, 2007.

U.S. Appl. No. 11/770,567, Matthew Self, System and Method of Detecting Product Code Duplication and Product Diversion, filed Jun. 28, 2007.

U.S. Appl. No. 11/612,191, Elliott Grant, Method and System for Deterring Product Counterfeiting, Diversion and Piracy on a Single System, filed Dec. 18, 2006.

U.S. Appl. No. 11/612,209, Elliott Grant, Method and System to Provide Security Information when Authenticating Product Code, filed Dec. 18, 2006.

U.S. Appl. No. 12/054,654, Elliott Grant, Systems and Methods for Associating Production Attributes with Products, filed Mar. 25, 2008.

U.S. Appl. No. 12/143,016, Elliott Grant, Duo Codes for Product Authentication, filed Jun. 20, 2008.

U.S. Appl. No. 12/359,151, Elliott Grant, Adding Traceability Codes to Produce Labels without Increasing the Size thereof, filed Jan. 23, 2009.

U.S. Appl. No. 12/471,201, Elliott Grant, Case Labeling for Field-Packed Produce, filed May 22, 2009.

U.S. Appl. No. 12/501,240, Elliott Grant, Mobile Table for Implementing Clamshell-to-Case Association, filed Jul. 10, 2009.

U.S. Appl. No. 12/370,346, J. Scott Carr, Systems and Methods of Associating Individual Packages with Harvest Crates, filed Feb. 12, 2009.

U.S. Appl. No. 12/576,092, Elliott Grant, Voice Code for Distribution Centers, filed Oct. 8, 2009.

U.S. Appl. No. 12/580,506, Elliott Grant, Method and System for Deterring Product Counterfeiting, Diversion and Piracy, filed Oct. 16, 2009.

U.S. Appl. No. 12/689,949, Elliott Grant, Voice Code with Primary and Secondary Digits, filed Jan. 19, 2010.

U.S. Appl. No. 12/850,909, Elliott Grant, Method and System for Deterring Product Counterfeiting, Diversion and Piracy, filed Aug. 5, 2010.

U.S. Appl. No. 12/877,467, Elliott Grant, Lot Identification Codes for Packaging, filed Sep. 8, 2010.

U.S. Appl. No. 12/908,667, Elliott Grant, Methods for Correlating First Mile and Last Mile Product, filed Oct. 20, 2010.

U.S. Appl. No. 13/004,173, Elliott Grant, Systems and Methods for using a Search Engine to Implement Product Traceability, filed Jan. 11, 2011.

U.S. Appl. No. 13/034,208, Elliot Grant, Methods for Assigning Traceability Information to and Retrieving Traceability Information from a Store Shelf, filed Feb. 24, 2011.

U.S. Appl. No. 13/053,200, Elliot Grant, Attributing Harvest Information with Unique Identifiers, filed Mar. 21, 2011.

U.S. Appl. No. 13/221,520, Elliot Grant, Case Labeling for Field-Packed Produce, filed Aug. 30, 2011.

Secure Symbology, Inc. Business Overview, May, 2008.

Paul Chang, IBM Industry Forum 2010, Mexico Industry Event, 2010.

PCT/US08/75626 International Search Report and Written Opinion, Nov. 26, 2008.

PCT/US06/03768 International Search Report and Written Opinion, Jun. 12, 2008.

Shibata et al., "Mechanism-based PKI," Computer System Symposium 2003, vol. 2003 (15), pp. 181-186, (1998); English Abstract.

Yoshinori Takagi, "Personal Certification and Identifiaction—Finger Print DNA," Monthly Electronics Magazine, vol. 43 pp. 55-57, (1998).

"CRC: Implementation", http://www.relisoft.com/science/crcnative.html @2006.

U.S. Appl. No. 12/143,016 Office action, mailed Oct. 25, 2011.

U.S. Appl. No. 12/143,016 Applicant's Amendment A, submitted Jan. 30, 2012.

* cited by examiner

SYSTEMS AND METHODS FOR EMPLOYING DUO CODES FOR PRODUCT AUTHENTICATION

CROSS-REFERENCE TO RELATED APPLICATIONS

This application is a Continuation-in-Part of U.S. patent application Ser. No. 11/743,648 filed on May 2, 2007 now abandoned and titled "System and Method of Product Information Coding and Authentication" which is a Continuation-in-Part of U.S. patent application Ser. No. 11/347,424 filed on Feb. 2, 2006 now U.S. Pat. No. 7,614,546 and titled "Method and System for Deterring Product Counterfeiting, Diversion and Piracy," which claims priority from U.S. Provisional Patent Application No. 60/650,364 filed on Feb. 3, 2005 and titled "System, Method and Technique for Combating Product Counterfeiting, Piracy and Diversion." This application is also related to U.S. patent application Ser. Nos. 11/612,191 and 11/612,209, both continuations of U.S. patent application Ser. No. 11/347,424. This application is also related to U.S. patent application Ser. Nos. 11/619,747, 11/743,652, and 11/770,567, each a Continuation-in-Part of U.S. patent application Ser. No. 11/347,424. Each of the applications noted in this paragraph are incorporated herein by reference. This application is also related to U.S. patent application Ser. No. 12/143,016 filed on even date herewith and titled "Duo Codes for Product Authentication."

BACKGROUND OF THE INVENTION

1. Field of the Invention

The present disclosure relates generally to the field of product manufacturing and distribution and more specifically to systems and methods for product authentication.

2. Description of the Prior Art

Increased globalization has lead to worldwide manufacturing and distribution of many consumer goods. While such globalization has generally resulted in lower prices for consumer goods, it has also provided additional opportunities for product counterfeiting and diversion. In order to perpetrate the deception, counterfeit goods are sometimes packaged in otherwise legitimate packaging, or labeled with counterfeit security measures such as tamper-evident seals with fake holographic images. As another example, an expensive component may be removed from a product and replaced with a counterfeit copy. A casual inspection of the product would not reveal the switch.

Accordingly, systems and methods are needed to better detect and deter the various forms of product counterfeiting and diversion.

SUMMARY

An exemplary method for generating pairs of cipher texts comprises generating a first code including bits representing an identification number and a switch bit having a first value, and generating a second code including bits representing the identification number of the first code, and a bit representing the switch bit having a second value. The first code is encrypted to generate a first cipher text and the second code is encrypted to generate a second cipher text. Encryption can be performed using a secure cipher such as a Triple Data Encryption Standard cipher. In some embodiments, the identification number comprises a serial number, and in further embodiments also comprises a checksum. In other embodiments, the identification number comprises a batch number, and in further embodiments also comprises an item number.

Another exemplary method for generating pairs of cipher texts comprises generating a first code consisting of a series of bits, each bit having a value, and at least one of the bits being a switch bit having a first value, and generating a second code consisting of the same series of bits with the same values as in the first code, except that the at least one switch bit has a second value. The first code is encrypted to generate a first cipher text and the second code is encrypted to generate a second cipher text. Here, the series of bits of the first code, other than the one or more switch bits, can comprise an identification number which may comprise a serial number or a batch number, in various embodiments.

An exemplary system for recording pairs of cipher texts comprises a computer-readable medium including a data structure. The data structure comprises an encryption of a first code and an encryption of a second code logically related to the first code. Here, the first code consists of a series of bits including at least one switch bit, where each of the bits of the first code have a value. The second code also consists of the same series of bits with the same values as the bits of the first code, except that at least one of the switch bits of the second code has a different value than the same bit in the first code. The first and second codes can each comprise the same identification number, in some instances. In some embodiments, the data structure logically relates the first code to the second code by arranging the first and second codes as a pair.

An exemplary system for using the paired cipher texts comprises a first object marked with a first cipher text and a second object marked with a second cipher text. The first cipher text comprises an encryption of a first code having a identification number and at least one switch bit, and the second cipher text comprises an encryption of a second code having the identification number and the at least one switch bit, the at least one switch bit having a different value than in the first code. In various embodiments the first object comprises a certificate and the second object comprises a detachable tamper-evident portion attached to the certificate, the first object comprises an outer packaging and the second object comprises an inner packaging disposed within the outer packaging, or the first object comprises a product and the second object comprises a component of the product. Objects marked with the cipher texts can comprise the cipher texts printed onto the objects or printed on labels affixed to the objects.

An exemplary method for marking products comprises marking the product with a first cipher text that is an encryption of a first code having an identification number and at least one switch bit, and marking a component or a packaging of the product with a second cipher text that is an encryption of a second code having the identification number and the at least one switch bit, where the at least one switch bit has a different value than in the first code. In these embodiments, marking the product and the component or packaging comprises generating the first and second cipher texts. Generating the first and second cipher texts can include, in some of these embodiments, appending a switch bit to an identification number to create a first code, changing only the value of the switch bit of the first code to create a second code, encrypting the first code to generate the first cipher text, and encrypting the second code to generate the second cipher text. Still other embodiments further comprise activating the identification number, which can further comprise digitally signing the first cipher text. The exemplary method can also comprise, in some instances, associating a target with the identification number, where the target can be, for example, a destination for the product.

An exemplary method for marking products comprises marking an outer packaging of the product with a first cipher text that is an encryption of a first code having an identification number and at least one switch bit, and marking an inner packaging of the product with a second cipher text that is an encryption of a second code having the identification number and the at least one switch bit, the at least one switch bit having a different value than in the first code. In these embodiments, marking the outer and inner packagings can comprise generating the first and second cipher texts. The exemplary method can further comprise activating the identification number and/or associating a target with the identification number.

Business methods are also provided herein. An exemplary business method comprises selling a service. The service includes providing pairs of cipher texts and receiving an activation notification for one of the first or second cipher texts of a provided pair of cipher texts. Here, a first cipher text of each pair is an encryption of a first code, and a second cipher text of each pair is an encryption of a second code. Moreover, each of the first and second codes consists of the same series of bits encoding the same identification number and also consists of at least one switch bit having a different value between the first and second codes. Providing the pairs of cipher texts can include providing a roll having two parallel columns of labels such that one column includes first cipher texts and the other column includes second cipher texts. Providing the pairs of cipher texts can also include providing certificates of authenticity each having a detachable tamper-evident portion, where the first cipher text of each pair is disposed upon the certificate of authenticity and the second cipher text of each pair is disposed upon the detachable tamper-evident portion. Providing pairs of cipher texts can also include providing a computer-readable file encoding the pairs of cipher texts according to a data structure that logically relates the first and second cipher texts of each pair.

In some embodiments of the exemplary business method, receiving the activation notification comprises receiving one of the cipher texts and a digital certificate. Some of these embodiments further comprise storing a record of the activation in a database, where the record includes the digital certificate. Some embodiments of the exemplary business method also further comprise receiving a target associated with the cipher text of the activation notification. In still additional embodiments, the service of the business method further comprises receiving a cipher text from a requester and locating a matching record in the database. In some of these embodiments, the method further comprises sending information from the matching record to the requester.

An exemplary computing system comprises logic configured to send pairs of cipher texts and logic configured to receive an activation notification for one of the cipher texts of one of the sent pairs of cipher texts. Here, a first cipher text of each pair is an encryption of a first code, and a second cipher text of each pair is an encryption of a second code. Further, each of the first and second codes consists of the same series of bits encoding the same identification number and at least one switch bit having a different value between the first and second codes. The exemplary computing system can also comprise logic configured to receive and decrypt a cipher text, and in some of these embodiments the computing system further comprises logic configured to store the decrypted code resulting from the decryption of the received cipher text.

DETAILED DESCRIPTION OF THE INVENTION

The present disclosure is directed to systems and methods for product authentication. These systems and methods employ two or more cryptographically linked codes that when encrypted appear unrelated, but upon decryption correlate with one another. Codes described herein are characterized by a series of bits including one or more switch bits. After encryption, these codes are cipher texts. The cipher text of a code having a switch bit in one state will appear to be unrelated to the cipher text of another code differing only in that the switch bit is in the opposite state. The cryptographically linked codes can be used for product authentication, typically by designating one cipher text as an inner cipher text and another cipher text as an outer cipher text. The outer cipher text is placed in an easily accessible location, such as the exterior of a product, while the inner cipher text is placed in a less accessible location such as on a sub-component of the product, such as a disk drive.

Figure 1:
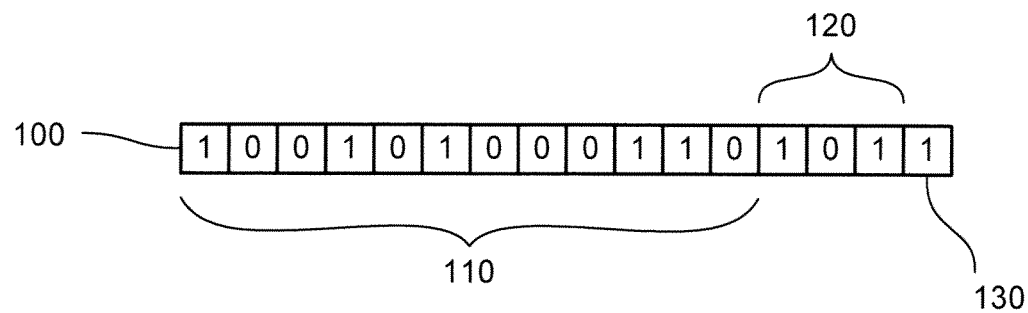
FIGS. 1 and 2 show two cryptographically linked codes according to an exemplary embodiment.

FIG. 1 illustrates an exemplary code 100 comprising a series of bits. Reading from left to right, the first 12 bits of the exemplary code 100 represent a serial number 110, the next three bits represent a checksum 120, and the final bit is a switch bit 130. In general terms, the series of bits of code 100 consists of an identification number and at least one switch bit. In the particular example just given, the identification number is the combination of the serial number 110 and the checksum 120. It will be appreciated that the number of bits used for the serial number 110 and checksum 120 are purely exemplary, and essentially any number of bits can be used. As another example, the identification number of the code 100 can include any of a batch number, an item number, and a check value as described in U.S. patent application Ser. No. 11/743,648. Thus, another exemplary code 100 comprises 20 bits of a batch number, 24 bits of a serial number, 15 bits of a checksum and 1 switch bit. Additionally, more than one switch bit 130 can be employed. For example, two switch bits 130 can provide for a total of four cryptographically linked codes, three switch bits 130 can provide for a total of eight cryptographically linked codes, and so forth.

Figure 2:
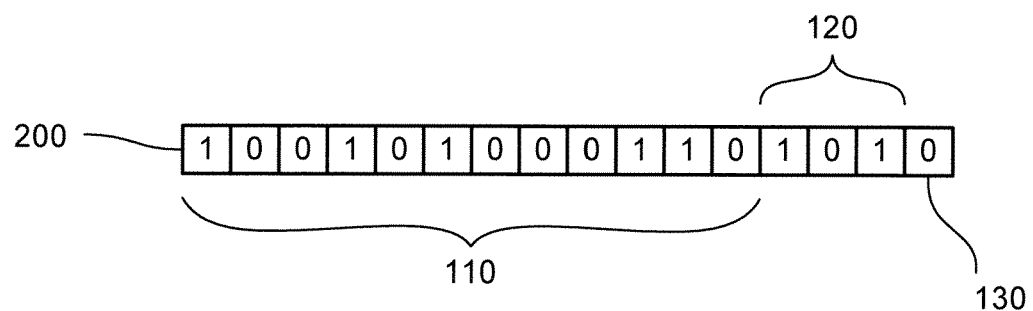

FIG. 2 shows another exemplary code 200 comprising the same serial number 110 and checksum 120 as in code 100, but with a different value for the switch bit 130. Since the codes 100 and 200 share the same serial number 110 and checksum 120, the codes 100 and 200 are related to one another. Generally, as here, code 200 consists of the same series of bits with the same values as in the first code, except that the at least one switch bit 130 has a different value than in the first code 100. Thus, in some embodiments, a switch bit 130 is appended to an identification number to create the first code 100, and only the value of the switch bit 130 of the first code 100 is changed to create the second code 200. It should be noted that although the switch bit 130 in FIGS. 1 and 2 is the final bit in codes 100 and 200, the switch bit can be in any location.

Figure 3:
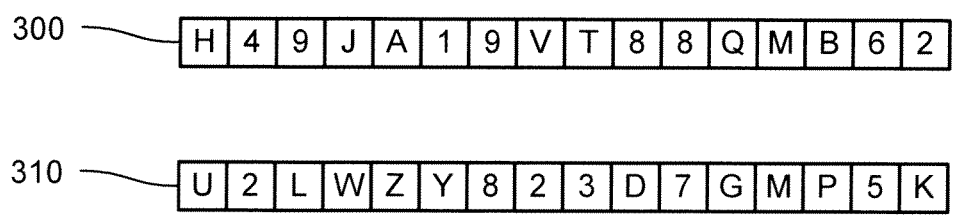
FIG. 3 shows two cipher texts derived by encrypting the cryptographically liked codes shown in FIGS. 1 and 2, according to an exemplary embodiment.

A secure cipher, such as the Triple Data Encryption Standard (TDES) cipher, is employed to encrypt the codes 100 and 200 with a key in order to produce two seemingly unrelated cipher texts. FIG. 3 shows a cipher text 300 derived by encrypting the code 100, and another cipher text 310 derived by encrypting the code 200. The difference in the single switch bit 130 results in cipher texts 300 and 310 that appear unrelated.

It will be appreciated that certain data manipulation functions are supported by the cipher texts 300 and 310. For example, one data manipulation function is to receive one of the cipher texts 300, 310, determine the identification number, and either generate the other cipher text 310, 300 or search a database for the presence of the identification number. Another example of a data manipulation function, is generating both cipher texts 300, 310 from the same identification number. A property of the relationship between the cipher texts 310 and 300 is that either one, when decrypted, reveals the same identification number. Another property of the relationship between the cipher texts 300 and 310 is that one cipher text 300, 310 cannot be predicted from the other cipher text 310, 300 and can only be determined by going through decryption and encryption steps.

Pairs of the codes 100, 200 and pairs of the cipher texts 300, 310 can both be stored and transmitted in various data structures and on different media, both electronic and computer-readable media, as well as non-electronic media such as on packaging, labels, and tamper-evident seals. Various data structures, for example, can be used to logically relate cipher texts 300 to cipher texts 310 for a plurality of pairs of cipher texts 300 and 310. For non-electronic media, the cipher texts 300 can be logically related to the cipher texts 310 as pairs of side-by-side labels on a roll, for instance.

Figure 4:
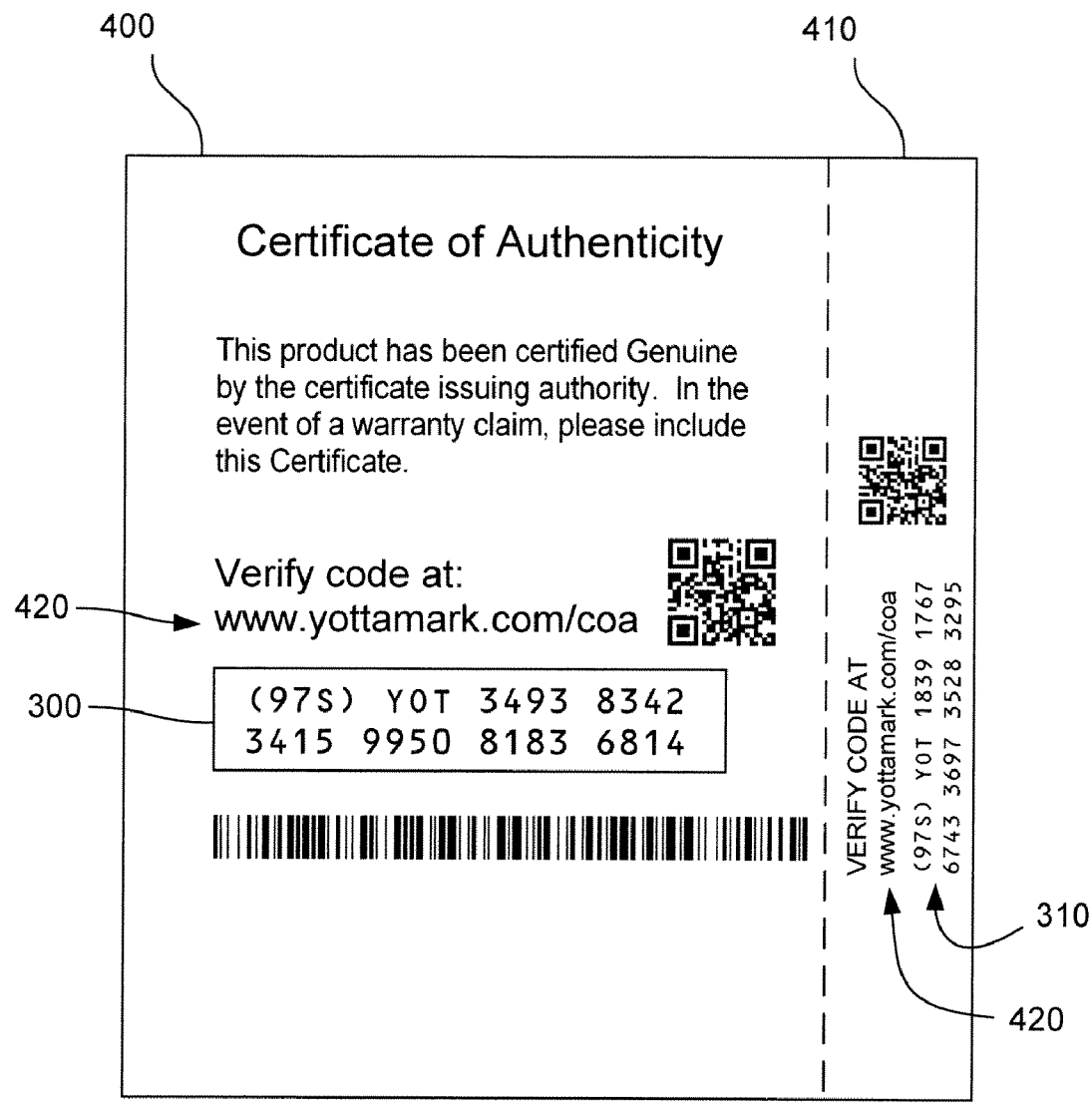
FIG. 4 shows a certificate of authenticity with a detachable tamper-evident portion according to an exemplary embodiment.

FIG. 4 shows an example in which a pair of cipher texts 300, 310 are printed on a certificate of authenticity 400 and a combined detachable tamper-evident portion 410. Here, the certificate of authenticity 400 includes one cipher text 300 and the tamper-evident portion 410 includes the other cipher text 310 where the cipher texts 300, 310 are encryptions of two codes that differ only in a state of a switch bit (e.g., codes 100 and 200). Such certificates of authenticity 400 with detachable tamper-evident portions 410 can be printed in bulk, with each pair of cipher texts 300, 310 based on a different set of cryptographically linked codes 100, 200. In some embodiments, the detachable tamper-evident portion 410 includes an adhesive backing. In some embodiments, each certificate of authenticity 400 includes an address 420, such as a Universal Resource Locator (URL), that can be used to check either cipher text 300, 310. In further embodiments, the detachable tamper-evident portion 410 also comprises the address 420, as shown in FIG. 4.

In some embodiments, the cryptographically linked codes 100, 200 underlying the cipher texts 300, 310 are recorded in a database in conjunction with the printing of the certificates of authenticity 400 with detachable tamper-evident portions 410. However, in other embodiments no such records are kept. In these latter embodiments, a certificate issuing authority can activate the cryptographically linked codes 100, 200, or the commonly shared identification number, of a certificate of authenticity 400 and the detachable tamper-evident portion 410 in conjunction with their application to an individual unit of a product and/or its packaging. Activation is described in greater detail, below.

Figure 5:
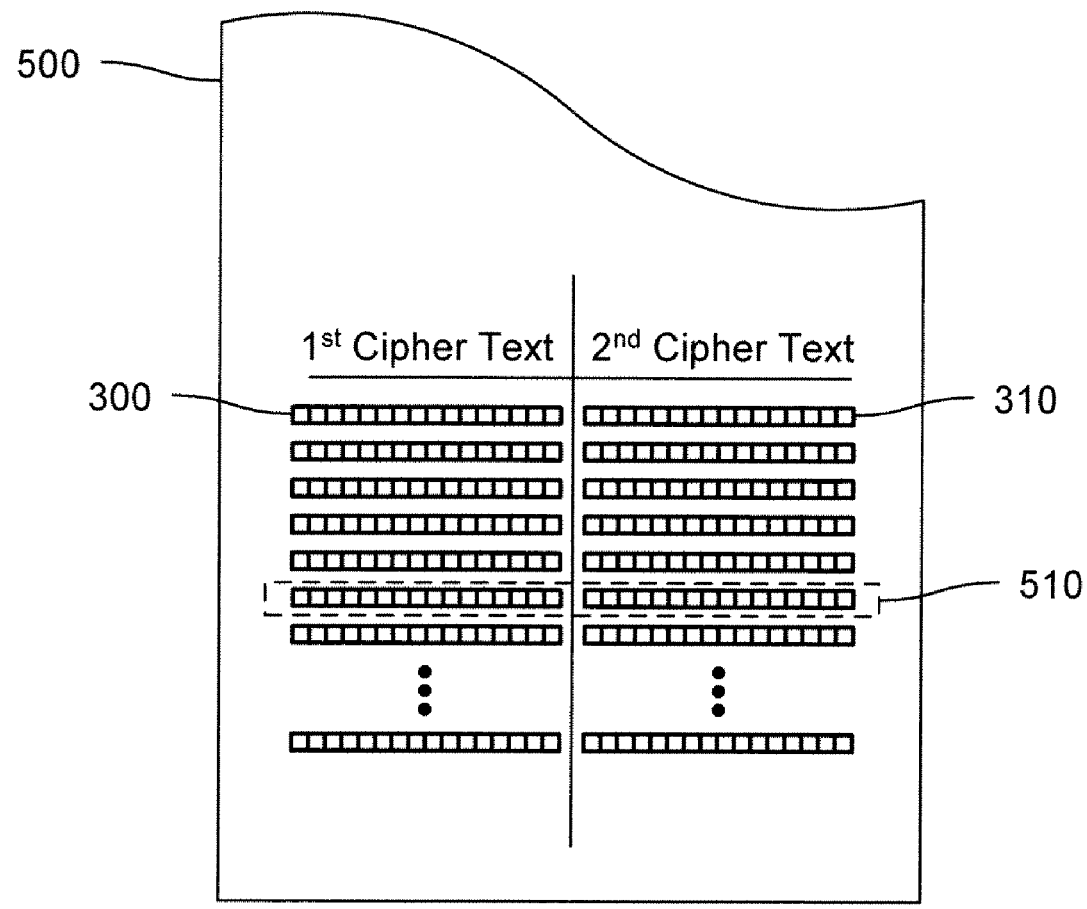
FIG. 5 shows a computer-readable file with a data structure that comprises pairs of cipher texts according to an exemplary embodiment.

FIG. 5 illustrates an exemplary data structure, here a computer-readable file 500, that logically relates cipher texts 300 and 310 in a plurality of pairs 510. Other suitable data structures include tables, spreadsheets, and databases, for example. In the file 500, the cipher texts 300 and 310 of any pair 510 are logically related in that they share a common row and also that each cipher text 300, 310 in a pair 510 is derived from the same identification number. Files 500, and other data structures that provide pairs of cipher texts 300 and 310, can be transmitted electronically and can be stored and distributed on computer-readable media. It will be understood that in those embodiments in which two or more switch bits are employed, data structures can logically relate three or more cipher texts.

An exemplary computer-readable medium comprises pairs of first and second codes 100, 200 arranged according to a data structure. The first and second codes 100, 200 in each pair each consist of a series of bits, at least one of which is switch bit. The codes 100, 200 are logically related in that each of the bits has the same value except for at least one of the one or more switch bits. Another exemplary computer-readable medium comprises pairs of first and second cipher texts 300, 310 arranged according to a data structure.

Figure 6:
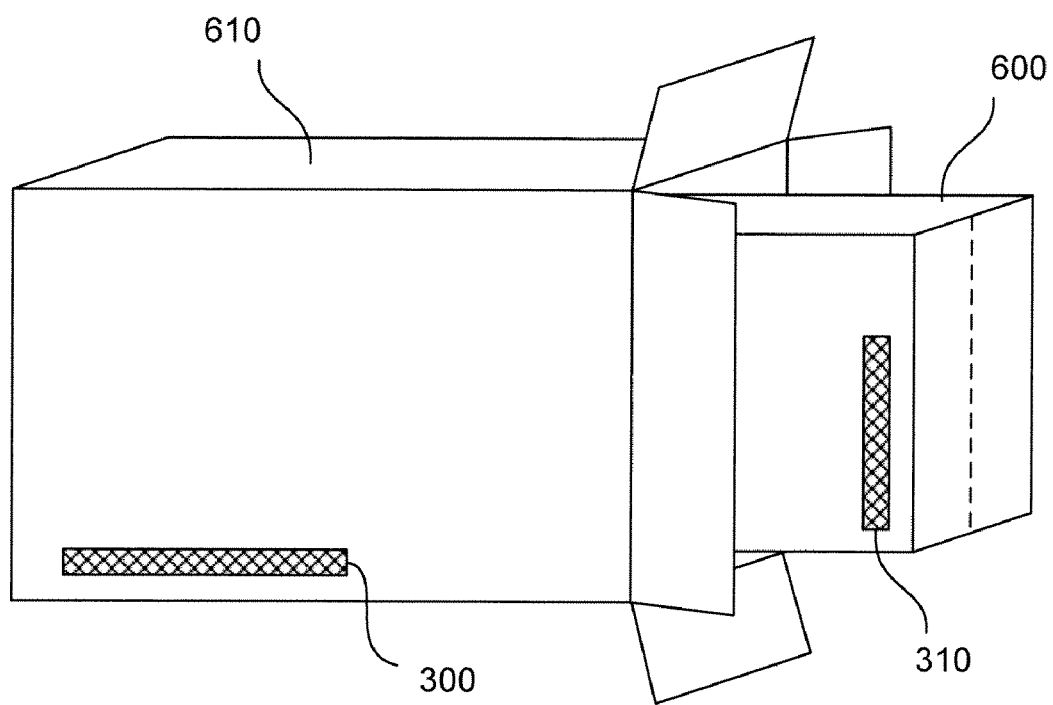
FIG. 6 shows an inner packaging disposed within an outer packaging, an outer cipher text disposed on the outer packaging, and an inner cipher text disposed on the inner packaging, according to an exemplary embodiment.

FIG. 6 illustrates an exemplary application for two cryptographically linked codes 100, 200. Here, a product (not shown) is packaged within an inner packaging 600 that is disposed within an outer packaging 610. An outer cipher text 300 is provided to the outer packaging 610 and an inner cipher text 310 is provided to the inner packaging 600. The cipher texts 300 and 310 appear unrelated although both are derived from cryptographically linked codes 100, 200. Preferably, the inner cipher text 310 cannot be viewed through the outer packaging 610.

Although represented as simple boxes in FIG. 6, the packagings 600 and 610 can be any form of packaging including plastic, paper, and foil wrappers, clamshells, and so forth. In some embodiments, the cipher texts 300 and 310 are provided to the packagings 600 and 610 on adhesive labels, while in other embodiments the cipher texts 300 and 310 are directly marked onto the packagings 600 and 610 such as by a printing process or by laser scribing, for example. In some instances the outer cipher text 300 is provided on a tamper-evident seal on the packaging 600. The tamper-evident seal is destroyed when the packaging 600 is opened. Accordingly, the outer cipher text 300 will become unreadable once the packaging 600 has been opened, or even if still readable, the tamper-evident seal may not be used to re-seal another packaging with a readable cipher text 300. In still other embodiments, the inner cipher text 310 can be on a warranty card or certificate of authenticity 400 that is packaged with the product.

It will be understood that the placement of the cipher texts 300 and 310 are not limited to placements on nested packagings as described with respect to FIG. 6. Thus, the embodiment shown in FIG. 6 should be viewed as exemplary of systems in general that comprise a first object marked with a first cipher text comprising an encryption of a first code having a identification number and at least one switch bit, and a second object marked with a second cipher text comprising an encryption of a second code having the identification number and the switch bit, the at least one switch bit having a different value than in the first code. Marking the objects can take the form of direct engraving or printing on the object, or a label, sticker, or seal, affixed thereto. The certificate of authenticity 400 with the detachable tamper-evident portion 410 in FIG. 4 provides another example of a system of two objects each marked with a cipher text related through an underlying codes as described above.

In certain embodiments, the system comprises cipher texts 300 and 310 provided to a product and its single packaging. Likewise, the outer cipher text 300 can be provided to a product while the inner cipher text 310 can be provided to a component of the product. Where a product is an electronic device, for example, the outer cipher text 300 can be provided to the housing of the electronic device while the inner cipher text 310 can be provided to a component of the electronic device such as the processor chip, a disk drive, a display, a cooling fan, and so forth. Where codes 100, 200 include more than one switch bit, moreover, three or more cipher texts based on three or more cryptographically linked codes can be provided to any of the product, its packaging, and its components. As one example, employing two switch bits 130 will allow for two seals on an outer packaging, and a certificate of authenticity 400 inside the packaging.

Figure 7:
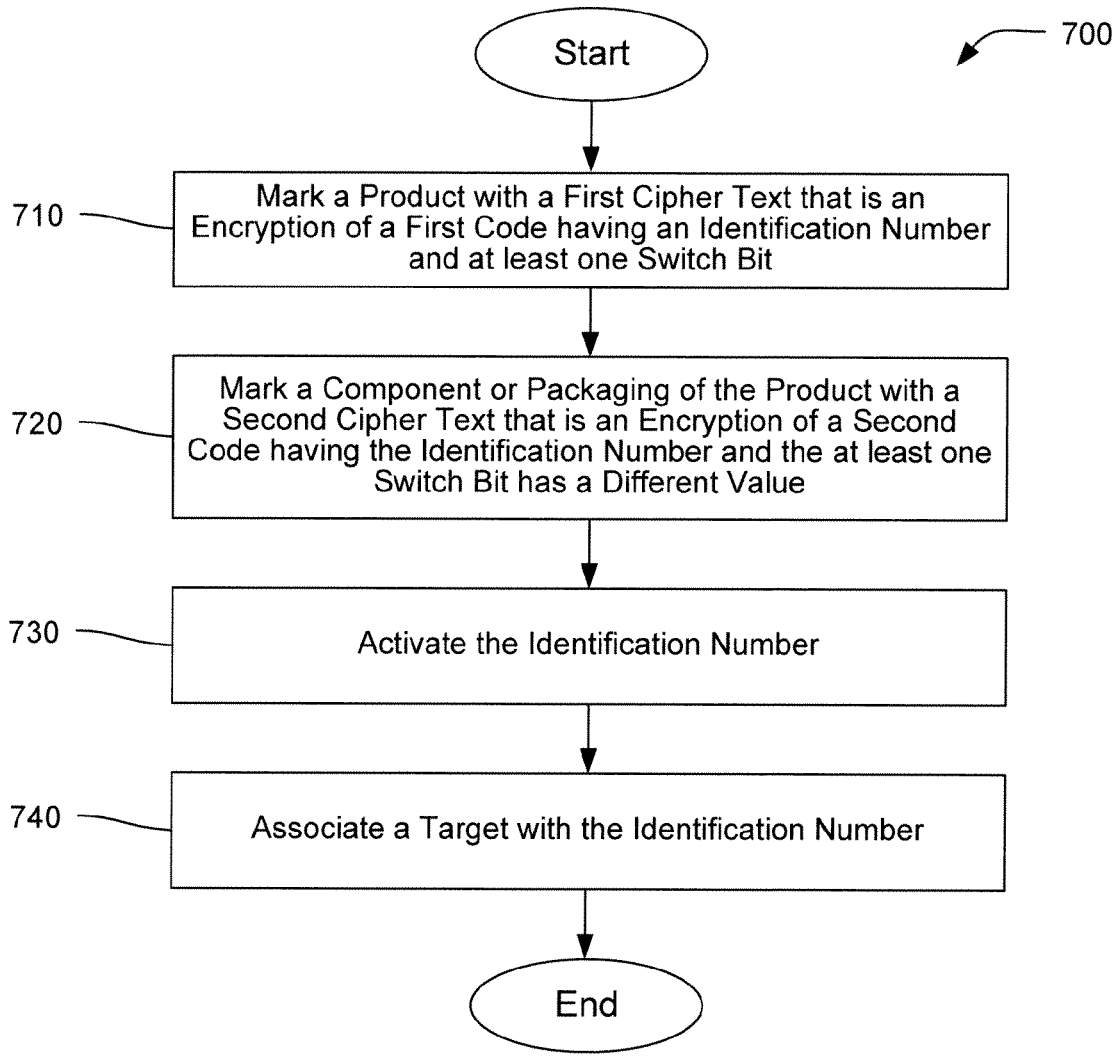
FIG. 7 shows a flow-chart representation of a method for marking products according to an exemplary embodiment.
Figure 8:
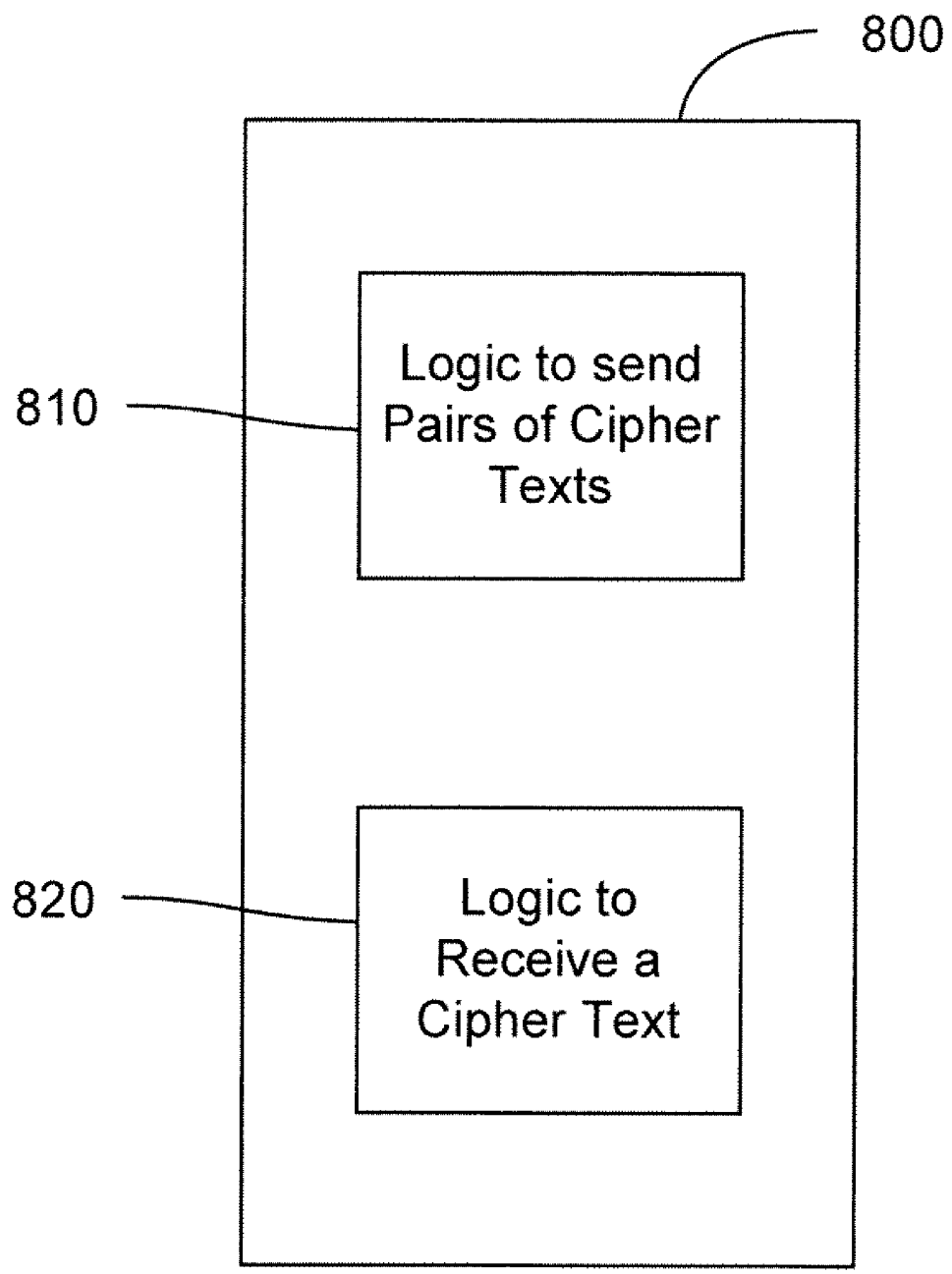
FIG. 8 shows a schematic representation of a computing system according to an exemplary embodiment.

FIG. 7 illustrates an exemplary method 700 for marking products. The method comprises a step 710 of marking the product with a first cipher text 300 that is an encryption of a first code 100 having an identification number and at least one switch bit 130. The method 700 also comprises a step 720 of marking a component or a packaging of the product with a second cipher text 310 that is an encryption of a second code 200 having the identification number and the at least one switch bit 130, where the at least one switch bit 130 has a different value than in the first code 100.

The steps 710 and 720 can comprise, for example, receiving a certificate of authenticity 400 with a detachable tamper-evident portion 410, detaching the certificate of authenticity 400 from the tamper-evident portion 410, packaging the certificate of authenticity 400 with the product, and sealing the packaging with the tamper-evident portion 410. In other embodiments, the steps 710 and 720 can comprise receiving a computer-readable file 500 comprising pairs 510 of cipher texts 300, 310 derived from cryptographically linked codes 100, 200, and can further comprise printing the cipher texts 300, 310 with a secure printer. The computer-readable file 500 can be received by the secure printer electronically, or can be received on a computer-readable medium such as a magnetic or optical recording disk, flash memory, and the like. The secure printer can then be used to print certificates of authenticity 400 with detachable tamper-evident portions 410 on an as-needed basis, for example. The secure printer can alternatively be used to print the pairs 510 of cipher texts 300, 310 on pairs of adhesive-backed labels, for instance.

In still other embodiments, the steps 710 and 720 can comprise generating the first and second cipher texts 300, 310. Thus, for example, the steps 710 and 720 can comprise receiving a local encryption key and a computer-readable file 500 including pairs of cryptographically linked codes 100, 200. The local encryption key is then used to generate pairs 510 of cipher texts 300, 310 by encrypting the pairs of cryptographically linked codes 100, 200. Since the pairs of cryptographically linked codes 100, 200 differ only in a value of one or more switch bits 130, it is also possible to have the transmitted computer file 500 comprise merely a list of codes 100, rather than pairs of cryptographically linked codes 100, 200, since a cryptographically linked code 200 can be readily derived from another code 100 simply by changing the state of the one or more switch bits 130. Further still, the codes 100 listed in the transmitted computer-readable file 500 need not include switch bits 130 at all, since switch bits 130 can be readily added to identification numbers.

The method 700 can comprise several optional steps as well. For example, in some embodiments the method 700 further comprises a step 730 of activating the identification number. In still further embodiments, the method 700 also comprises a step 740 of associating a target with the identification number to prevent diversion, for example. In various embodiments, the target can comprise a wholesaler or retailer generally, or a specific destination such as a city, a distribution point, or a particular retail outlet.

The step 730 comprises activating the identification number. Activating the identification number can include, for example, a certificate issuing authority using a secure client to digitally sign either of the first or second cipher texts 300, 310. Digital signing can be performed, for example, by any number of standard two-party authentication methods. In some embodiments, the certificate issuing authority reads a cipher text 300 or 310, such as with a bar code scanner, and transmits the cipher text 300 or 310 and a digital certificate that certifies the issuing authority to a third party that generated the first and second cipher texts 300, 310. The signed cipher text 300 or 310 can then be stored with the digital certificate, or the cipher text 300 or 310 can instead be decrypted first to a code 100 or 200 consisting of the identification number and the one or more switch bits 130. The code 100 or 200, or simply just the identification number, can then be stored in conjunction with the digital certificate.

Another method that is similar to the method 700 is also a method for marking products. In this method, an outer packaging 610 of the product is marked with a first cipher text 300 that is an encryption of a first code 100 having an identification number and at least one switch bit 130, and an inner packaging 600 of the product is marked with a second cipher text 310 that is an encryption of a second code 200 having the identification number and the at least one switch bit 130, the at least one switch bit 130 having a different value than in the first code 100. Just as in method 700, embodiments of this method can also further comprise a step of generating the first and second cipher texts, a step of activating the identification number, and/or a step of associating a target with the identification number. Method 700, and the similar variant just described, can also include a step of associating the identification number with various information, such as at the time of activation. As generally described in U.S. patent application Ser. No. 11/347,424 and the noted related applications, such information can include a product description as well as details pertaining to the manufacture of the particular product.

Business methods are also provided herein. An exemplary business method comprises selling a service wherein pairs 510 of cipher texts 300, 310 are provided, for example to a manufacturer. In each pair 510 of cipher texts 300, 310 a first cipher text 300 is an encryption of a first code 100, a second cipher text 310 is an encryption of a second code 200, and each of the first and second codes 100, 200 consists of the same series of bits encoding the same identification number and at least one switch bit 130 having a different value between the first and second codes 100 and 200. The service further comprises receiving an activation notification for one of the first or second cipher texts 300 or 310 of a provided pair 510 of cipher texts. Receiving the activation notification can comprise, in some instances, receiving one of the cipher texts 300 or 310 and a digital certificate. The service can also comprise receiving a target associated with one of the cipher texts 300 or 310.

In further embodiments, the service further comprises storing in a database a record of the activation of the activated cipher text 300 or 310. The record can include, for example, the received digital certificate and the received cipher text 300 or 310. The service can further comprise decrypting the cipher text 300 or 310 and storing either the code 100 or 200, or the identification number, in association with the digital certificate in place of, or in addition to, the cipher text 300 or 310. In some embodiments, the record also includes the received target.

In still further embodiments, the service additionally comprises receiving a cipher text and comparing the cipher text to records in the database. In some of these embodiments, for example, the cipher text is received as an authentication request from a consumer, a product distributor, or a product retailer. Comparing the cipher text to records in the database can comprise decrypting the cipher text and searching records of the database for the decrypted code or identification number, in some instances.

If the cipher text was previously activated, then a record including the cipher text, or an underlying code or identification number, can be located in the database. In these instances, information from the record can be provided to the requestor. The information can include, for example, the name of the certificate issuing authority that activated the cipher text. As generally described in U.S. patent application Ser. No. 11/347,424 and the noted related applications, other stored information pertaining to the manufacture and the distribution of the individual unit of the product can also be provided. Providing stored information is response to the receipt of a cipher text 300 or 310 can be performed repeatedly for either or both of the cipher texts 300 and 310 to provide the stored information as many times as desired. Since the cipher texts 300 and 310 are the same except for the switch bit 130, reading either cipher text 300, 310 can cause the same information to be retrieved.

The record can also be used, in some instances, to compare the target with an indication of location derived from the authentication request. For example, the authentication request can be received from a static IP address associated with a server at a particular location. The comparison of the target with the location of the authentication request can suggest an instance of diversion where the two do not correlate. In still further embodiments, the receipt of a cipher text that has not been activated, or the repeated receipt of a cipher text that has been activated, or an invalid check value, can suggest other types of malfeasance, such as counterfeiting. Here, the service can comprise determining a suspicion of diversion or counterfeiting and notifying a third party, such as a manufacturer. Exemplary methods for detecting product counterfeiting and diversion are described in greater detail in U.S. patent application Ser. No. 11/347,424 and the noted related applications.

Still further embodiments take advantage of the relationship of the cipher texts 300 and 310 as marked on the product and/or its packaging. In some embodiments, once an inner cipher text 310 is presented for authentication, the code 100 corresponding to the outer cipher text 300 is invalidated. In these embodiments, presenting the inner cipher text 310 for authentication indicates, for example, that an outer packaging was opened, a tamper evident seal was broken, or a product's housing was compromised. In some instances, receiving the inner cipher text 310 for authentication can also be used as evidence of a user's agreement to a software license or to void a product warranty.

An exemplary business method will be described, below. In this example a manufacturer of a particular product decides to designate the remaining inventory of the product as spares, and otherwise pull them from the market. The company pulls back all remaining inventory of the product and assigns the inventory to a distributor. In the exemplary business method described above, either the company or the distributor can be the purchaser of the service. Under the service, pairs 510 of cipher texts 300, 310 are provided to the distributor, the distributor places a certificate of authenticity 400 with each product in a package, and then seals the package with a tamper-evident portion 410. The distributor can digitally sign either cipher text 300 by reading the cipher text 300 from the certificate of authenticity 400 before the package is sealed, or can digitally sign the cipher text 310 by reading the cipher text 310 from the tamper-evident portion 410 on the package. At the time of activation, the distributor knows that the packaged product will be sent to Boston. According to the exemplary business method, an activation notification is received from the distributor. The activation notification can include the signed cipher text 300 or 310, the digital certificate, the product description, and the target—Boston. This information can be stored for later retrieval.

Subsequently, the signed cipher text 310 from the tamper-evident portion 410 is received from a consumer as part of an authentication request. The signed cipher text 310 is found within a database and a verification is then sent to the consumer to verify that the product was signed by the distributor and is genuine. As a further part of the service provided by the business method, a location for the authentication request is determined and compared against the target. A discrepancy, or a pattern of discrepancies determined over a number of authentication requests, can be reported to the manufacturer or the distributor.

Subsequently, the signed cipher text 300 from the certificate of authenticity 400 is received from a consumer as part of an authentication request. The signed cipher text 300 is found within a database and a verification is then sent to the consumer to verify that the product was signed by the distributor and is genuine. The signed cipher text 300 is decrypted and from the switch bit 130 it is determined that the signed cipher text 300 was the inner cipher text from the certificate of authenticity 400. Thus, the package had to have been opened and therefore the cipher text 310 can be deactivated. Any subsequent authentication request that includes the cipher text 310 can be viewed as suspicious and potentially an indication of counterfeiting, for example.

While the previous example is directed to actively detecting diversion and counterfeiting, the following example helps to illustrate how the use of cryptographically linked codes provides a deterrent to diversion. For example, although a diverter can try to disguise their fraud by obliterating or otherwise defacing the outer cipher text 300, the inner cipher text 310 still can reveal the original target. The diverter cannot simply replace the outer cipher text 300, because the outer cipher text 300 will no longer match the inner cipher text 310. Additionally, the diverter cannot replace the pair of cipher texts 300, 310, because the diverter cannot digitally sign the cipher texts 300, 310 as coming from the original manufacturer or reseller. Repackaging, being the reuse of old packaging, can also be deterred by the use of cryptographically linked codes. Once a seal including the outer cipher text 300 is broken, the seal cannot be replaced, and once the inner cipher text 310 is presented for authentication, the outer cipher text 300 is invalidated. Therefore, a repacker cannot reuse the outer or inner cipher texts 300, 310.

One advantage realized by some of the embodiments described herein is the quality of massive scalability. Such scalability can be achieved since there is no need to maintain a database that stores pairs of random associated codes. Indeed, there's no need to store any of the cipher texts in a database. As noted above, in some embodiments no records are maintained for any of the codes 100, 200 or cipher texts 300, 310 until an activation notification is received, and then the received cipher text 300 or 310 can be decrypted and a record created for the resulting identification number.

Exemplary computing systems for implementing methods described above are also provided. A computing system 800 comprise logic 810 configured to send pairs 510 of cipher texts 300, 310, and also logic 820 configured to receive an activation notification for one of the cipher texts 300, 310 of the sent pairs 510 of cipher texts 300, 310. The system 800 can also comprise logic configured to receive and decrypt a cipher text, and logic configured to store the decrypted code that results from the decryption of the received cipher text.

In various embodiments, logic 810, 820, and the other logic noted above, each can comprise hardware, firmware, or software stored on a computer-readable medium, or combinations thereof. Such logic may comprise a computing system such as an integrated circuit, a microprocessor, a personal computer, server, distributed computing system, communication device, network device, or the like, and combinations of the same. Logic can also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital information. Logic 810 and 820, and other logic described above, can be implemented by separate software modules executed on a common server. In other embodiments, logic 810 and 820 can be implemented through different computing systems. Logic 810 and 820 can also be at least partially integrated together. In some embodiments, logic 810 and 820, and other logic described above, can be implemented by means programmed to perform specific method steps, such as means programmed to generate codes, means programmed to encrypt codes and/or decrypt cipher texts, means programmed to print cipher texts, means programmed to write cipher texts to computer-readable files and computer-readable media, means programmed to store and retrieve records from databases, and so forth.

The user experience is also worth noting herein. In one embodiment, a user, such as a retail consumer, electronically sends a cipher text over a network and receives an electronic authentication notification in response. For example, the user can follow the address 420 on a certificate of authenticity 400 to a webpage and then follow instructions provided on the webpage to submit the cipher text 300 to a computing system 800 for authentication. Provided that the computing system 800 has a stored record for the cipher text 300, or the associated code 100, or the underlying identification number, the user receives the electronic authentication notification in response. The authentication notification can indicate, for instance, the identity of the party that digitally signed the product. In the event that the computing system 800 does not have such a stored record, the user can be sent an advisory message indicating that the product could not be authenticated.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for marking products comprising:
  generating, using a microprocessor, first and second cipher texts by
    appending a switch bit having a value to an identification number to create a first code,
    changing only the value of the switch bit of the first code to create a second code comprising the same identification number and a switch bit having a value different than the value of the switch bit of the first code,
    encrypting the first code to generate the first cipher text, and
    encrypting the second code to generate the second cipher text;
  marking the product with the first cipher text; and
  marking a component or a packaging of the product with the second cipher text.

2. The method of claim 1 further comprising activating the identification number.

3. The method of claim 2 wherein activating the identification number comprises digitally signing the first cipher text.

4. The method of claim 1 further comprising associating a target with the identification number.

5. The method of claim 4 wherein the target comprises a destination for the product.

6. The method of claim 1 further comprising associating a product description with the identification number.

7. A method for marking products comprising:
  generating, using a microprocessor, first and second cipher texts by
    appending a switch bit having a value to an identification number to create a first code,
    changing only the value of the switch bit of the first code to create a second code comprising the same identification number and a switch bit having a value different than the value of the switch bit of the first code,
    encrypting the first code to generate the first cipher text, and
    encrypting the second code to generate the second cipher text;
  marking an outer packaging of the product with the first cipher text; and
  marking an inner packaging of the product with the second cipher text.

8. The method of claim 7 further comprising activating the identification number.

9. The method of claim 7 further comprising associating a target with the identification number.

10. A business method comprising:
  generating, using a microprocessor, pairs of first and second cipher texts by, for each pair,
    appending a switch bit having a value to an unique identification number to create a first code,
    changing only the value of the switch bit of the first code to create a second code comprising the same identification number and a switch bit having a value different than the value of the switch bit of the first code, encrypting the first code to generate the first cipher text, and encrypting the second code to generate the second cipher text; and selling a service including providing the pairs of cipher texts receiving an activation notification for one of the first or second cipher texts of a provided pair of cipher texts.

11. The method of claim 10 wherein providing pairs of cipher texts includes providing a roll having two parallel columns of labels such that one column includes first cipher texts and the other column includes second cipher texts.

12. The method of claim 10 wherein providing pairs of cipher texts includes providing certificates of authenticity each having a detachable tamper-evident portion, where the first cipher text of each pair is disposed upon the certificate of authenticity and the second cipher text of each pair is disposed upon the detachable tamper-evident portion.

13. The method of claim 10 wherein providing pairs of cipher texts includes providing a computer-readable file encoding the pairs of cipher texts according to a data structure that logically relates the first and second cipher texts of each pair.

14. The method of claim 10 wherein receiving the activation notification comprises receiving one of the cipher texts and a digital certificate.

15. The method of claim 14 further comprising storing a record of the activation in a database, the record including the digital certificate.

16. The method of claim 10 further comprising receiving a target associated with the cipher text of the activation notification.

17. The method of claim 10 wherein the service further comprises receiving a cipher text from a requestor and locating a matching record in a database.

18. The method of claim 17 further comprising sending information from the matching record to the requestor.

19. A computing system comprising:

logic, including a microprocessor, configured to generate pairs of first and second cipher texts by, for each pair, appending a switch bit having a value to an unique identification number to create a first code, changing only the value of the switch bit of the first code to create a second code comprising the same identification number and a switch bit having a value different than the value of the switch bit of the first code, encrypting the first code to generate the first cipher text, and encrypting the second code to generate the second cipher text;

logic configured to send the pairs of cipher texts and;

logic configured to receive an activation notification for one of the cipher texts of one of the sent pairs of cipher texts.

20. The computing system of claim 19 further comprising logic configured to receive and decrypt a cipher text.

21. The computing system of claim 20 further comprising logic configured to store the decrypted code resulting from the decryption of the received cipher text.

* * * * *